Feb. 25, 1930.  J. B. MILLS ET AL  1,748,786
ODOMETER DRIVE
Filed June 28, 1926
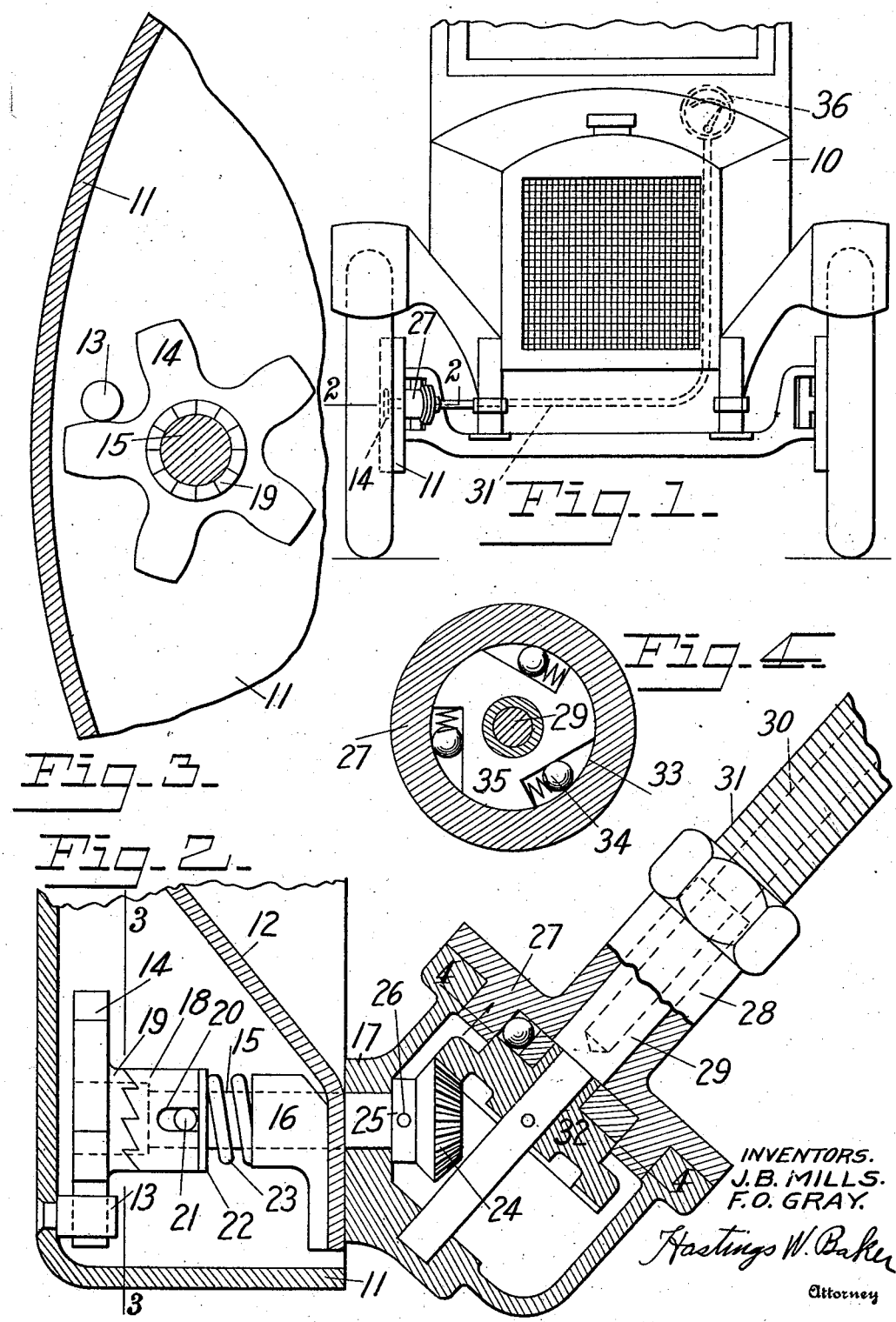
INVENTORS.
J. B. MILLS.
F. O. GRAY.
Hastings W. Baker
Attorney Patented Feb. 25, 1930

1,748,786

UNITED STATES PATENT OFFICE

JOHN B. MILLS AND FREDERICK O. GRAY, OF DAYTON, OHIO, ASSIGNORS TO OHMER FARE REGISTER COMPANY, OF DAYTON, OHIO, A CORPORATION OF NEW YORK

ODOMETER DRIVE

Application filed June 28, 1926. Serial No. 118,958.

This invention relates to an improved driving means for odometers, speedometers, taximeters, and the like.

More specifically, the invention relates to an improved drive which may be employed in a car equipped with brakes on the front wheels as is common in cars which today employ four-wheel brakes. Heretofore, it has been impossible to equip the front wheels with a drive connected to a driven instrument such as an odometer for the reason that the brake drum occupied the space which has heretofore been employed by the odometer driving means.

The invention also relates to an improved drive in which the torsion existing in the flexible shaft is not relieved when the vehicle moves reversely. Obviously, if the torsion were relieved under such conditions, the road wheels would of necessity move some distance before the torsion of the flexible shaft would become great enough to drive the odometer.

In the drawings, Figure 1 represents a front elevational view of an automobile having our improved drive incorporated therein.

Figure 2 is a plan view partly in section on the line 2—2 of Figure 1.

Figure 3 is a fragmentary elevational view partly in cross section on the line 3—3 of Figure 2, and Figure 4 is a cross sectional view of the clutch mechanism to prevent the unwinding of the flexible shaft when the car is backed.

Referring more particularly to the drawings in which like reference characters are used throughout to denote similar parts;

The outline of the car is denoted by the reference character 10, and the rotatable part of the front wheel brake by the reference character 11, while the stationary part is denoted by the character 12. The rotatable part 11, or the drum, is provided with a pin 13 which rotates therewith and engages a star wheel 14 rotatably mounted on a spindle 15, which spindle is journaled in a bracket 16 secured to the stationary part 12 or disc, through which disc the spindle 15 passes through a suitable opening and is journaled in a cup-shaped bracket 17 secured to the outside of the disc 12. The spindle 15 has splined thereto a sliding clutch member 18 provided with clutch teeth adapted to engage oppositely facing teeth on the flange 19 of the star wheel 14, the clutch member 18 being provided with a slot 20 receiving a pin 21 carried by the spindle 15. A circular plate or washer 22 abuts against the end of the sliding clutch member 18 and a helical spring 23 is interposed between said washer 22 and the bracket 16 so as to press the sliding clutch member 18 into engagement with the teeth on the flange 19. The spindle 15 carries a beveled pinion 24 which is secured thereto by means of a collar 25 and a pin 26 which passes through said collar and said spindle.

The cup-shaped bracket 17 is provided with a cover 27 provided with a shank 28 which serves as a bearing for a shaft 29 connected with the flexible shaft 30 within the tubing 31, which shaft 29 has secured thereto a pinion 32 in mesh with the pinion 24.

The cover 27 is provided with an annular ball raceway 33 which receives the spring pressed balls 34. The pinion 32 has secured thereto a clutch member 35 having cutaway portions to receive the balls 34. The annular portion of the cover 27, the balls 34 and the clutch member 35 form a ball clutch which successfully prevents the unwinding of the flexible shaft 30 in case the car is moved in a rearward direction.

Regardless of the direction of motion of the car the drum 11 will rotate with the wheels and the pin 13 will actuate the star wheel 14 for a distance equal to one tooth thereof each time the wheels of the car make a complete revolution. If the car is moving forward, the clutch member 18 will be actuated by the teeth on the flange 19 rotating the spindle 15, the pinions 24 and 32, the shaft 29 and the flexible shaft 30 which will, in turn, actuate the speedometer, odometer or other driven instrument 36, the clutch member shown in Figure 4 overrunning during such operation and serving no function. If the car is moved reversely the teeth on the sliding clutch member 18 will be cammed out of driving engagement with the teeth on the flange 19, the spring 23 being compressed during such movement. There would, however, be some tendency for the pinion 24 to be actuated when the car is moved rearwardly and, if it were, the distance travelled backwards would be subtracted from the forward distance which is undesirable. The ball clutch shown in Figures 2 and 4 locks the shaft 29 against such a movement and thereby prevents the tension in the flexible shaft 30 from being relieved.

While we have shown our invention as employed on an automobile, it is obvious that the same might be used in other relations and the changes and modifications might be made in the specific embodiment as shown by way of illustration in this application. We therefore desire to claim our invention broadly regardless of the use to which it might be put and reserve to ourselves the right to make such changes as may fall within the scope of the following claims.

Having now described our invention, we claim:

1. In combination with a road wheel and brake drum therefor consisting of a plate and a brake flange, a pin on said plate, a fixed disc forming a closure for said drum, a spindle supported by said disc, means whereby said pin drives said spindle in one direction when the road wheel is being rotated forwardly and means whereby said spindle is held against rotational movement when the road wheel is revolving in the other direction.

2. In combination with a road wheel and brake drum therefor consisting of a plate and a brake flange, a pin on said plate, a fixed disk forming a closure for said drum, a spindle mounted in said fixed disk, a pinion mounted on said spindle and actuated by said pin when said road wheel is moved in one direction, and means whereby said spindle is held against rotational movement when the road wheel is revolving in the other direction.

3. In combination with a road wheel of an automobile and brake drum therefor consisting of a plate and a brake flange, a pin on said plate, a fixed disk forming a closure for said drum, a spindle mounted in said fixed disk, a pinion rotatably mounted on said spindle, clutch means between said spindle and pinion, and means to hold said spindle against rotational movement when the automobile is being backed.

4. In combination with a road wheel of an automobile and brake drum therefor consisting of a plate and a brake flange, a pin on said plate, a fixed disk forming a closure for said drum, a spindle mounted in said fixed disk, a pinion rotatably mounted on said spindle and adapted to be driven by said pin, clutch means interposed between said pin and said spindle, so that said spindle will be positively driven when the road wheel is rolling in one direction, means whereby said clutch means is caused to overrun when the road wheel rolls reversely, and means to hold said spindle against rotational movement when the automobile is being backed.

5. In combination with a road wheel and brake drum therefor consisting of a plate and a brake flange, a pin on said plate, a fixed disc forming a closure for said drum, a spindle supported by said disc, a pinion carried by said spindle and adapted to be actuated by said pin, a second pinion carried by said spindle, a second shaft, a third spindle on said second shaft in engagement with said second mentioned pinion, means whereby said second shaft is rotated when said road wheel moves in one direction and is held against rotation when said road wheel moves in the opposite direction.

In testimony whereof we affix our signatures.

JOHN B. MILLS.
FREDERICK O. GRAY.